United States Patent [19]

Nambudiri

[11] Patent Number: 4,600,987
[45] Date of Patent: Jul. 15, 1986

[54] MONITORING CIRCUIT FOR AN ELECTRONIC POSTAGE METER

[75] Inventor: Easwaran C. N. Nambudiri, Hicksville, N.Y.

[73] Assignee: Pitney Bowes Inc., Stamford, Conn.

[21] Appl. No.: 447,750

[22] Filed: Dec. 8, 1982

[51] Int. Cl.[4] .................... G06F 9/00; G06F 11/00
[52] U.S. Cl. .............................. 364/200; 371/12; 371/62
[58] Field of Search .............. 307/228, 273; 364/200; 371/12, 62

[56] References Cited

U.S. PATENT DOCUMENTS 4,072,852  2/1978  Hogan et al. .................. 371/12
4,399,537  8/1983  Jones ........................ 371/62 X

FOREIGN PATENT DOCUMENTS 19515  11/1980  European Pat. Off. .

Primary Examiner—Felix D. Gruber
Assistant Examiner—Edward R. Cosimano
Attorney, Agent, or Firm—Michael J. DeSha; Albert W. Scribner; William D. Soltow, Jr.

[57] ABSTRACT

A monitoring circuit for an electronic postage meter operating under control of a programmed microprocessor, including a transistor switch for receiving an output signal from the programmed microprocessor and generating an output signal in response thereto; timer means electrically coupled to the transistor switch for generating an output pulse in the absence of a signal from the transistor switch within a predetermined time interval, logic gate means electrically coupled to the timer means for holding its output in a first logical state in the absence of a signal from the timer means and capable of changing its output to a second logical state in the presence of an output signal from the timer means, the logic gate means having its output electrically coupled to the programmed microprocessor to advise the same of a change in the logical state of its output.

9 Claims, 1 Drawing Figure

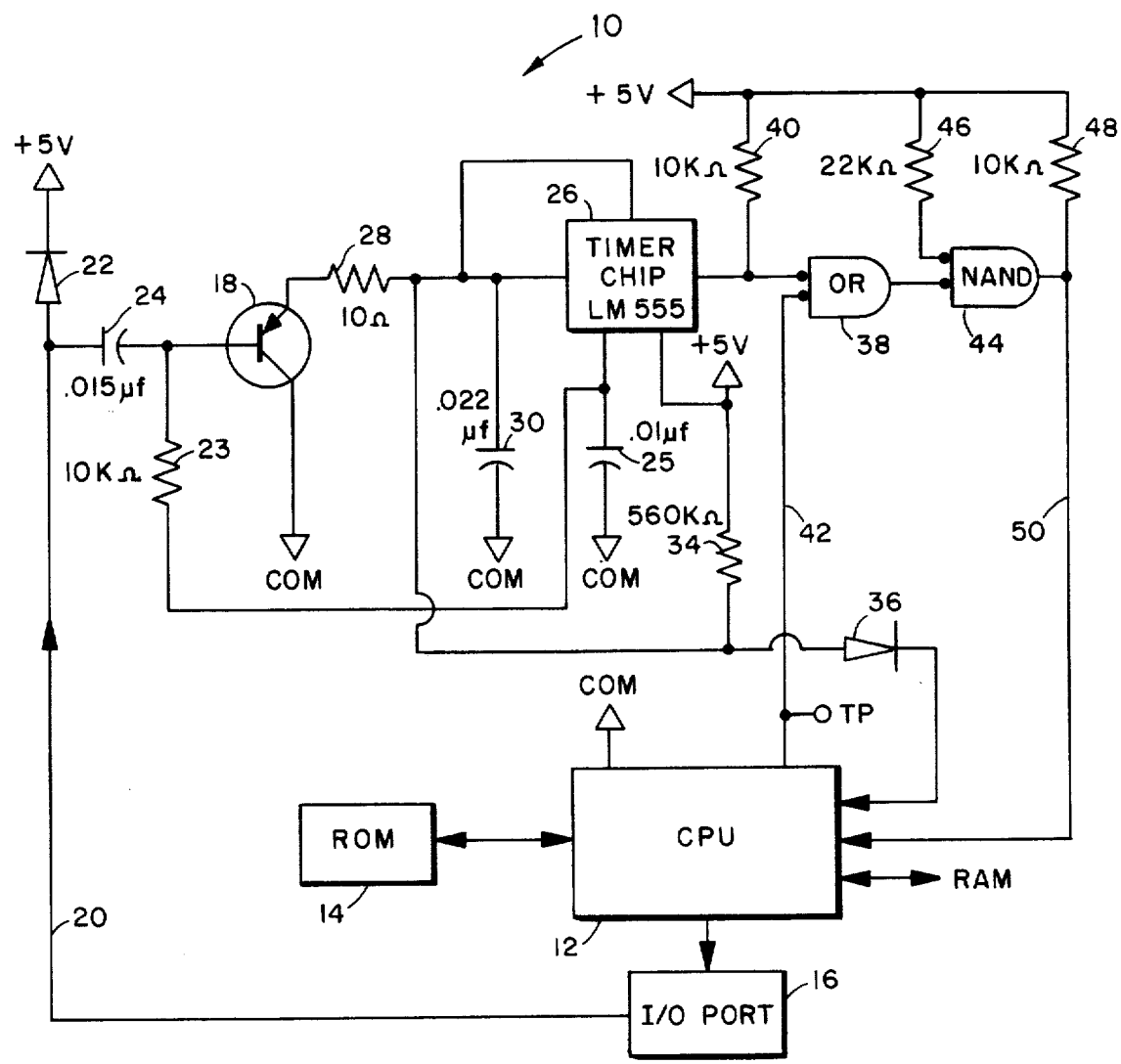

MONITORING CIRCUIT FOR AN ELECTRONIC POSTAGE METER

BACKGROUND OF THE INVENTION

The present invention relates to electronic postage meters and more specifically to electronic postage meters operating under control of a programmed microprocessor.

Electronic postage meters operating under control of a programmed microprocessor are disclosed in U.S. Pat. No. 4,301,507, issued on Nov. 17, 1981, and assigned to Pitney Bowes, Inc. of Stamford, Conn., and United Kingdom patent application No. 2,079,223A filed on July 9, 1980. In such postage meters it is desirable to monitor the state of the microprocessor to determine that it is operating in accordance with its programmed instructions.

SUMMARY OF THE INVENTION

It is an object of the present invention to provide a monitoring circuit for an electronic postage meter.

It is a further object of the present invention to provide a highly reliable monitoring circuit for an electronic postage meter operating under microprocessor control.

It is a still further object of the present invention to provide a monitoring circuit which is relatively simple in nature and therefore economical to implement.

It is a still further object of the present invention to provide a monitoring circuit for an electronic postage meter which may be readily disabled for testing purposes.

It is a still further object of the present invention to provide a monitoring circuit for an electronic postage meter which is disabled during power on.

Briefly, in accordance with the present invention, a monitoring circuit is provided for an electronic postage meter operating under control of a programmed microprocessor, including a transistor switch for receiving an output signal from the programmed microprocessor and generating an output signal in response thereto, timer means electrically coupled to the transistor switch means for generating an output pulse in the absence of a signal from the transistor switch means within a predetermined time interval, logic gate means electrically coupled to the timer means for holding its output in a first logical state in the absence of a signal from the timer means and capable of changing its output to a second logical state in the presence of an output signal from the timer means, the logic gate means having its output electrically coupled to the programmed microprocessor to advise the same of a change in the logical state of its output.

Other objects, aspects and advantages of the present invention will be apparent from the detailed description considered in conjunction with the preferred embodiment of the invention illustrated in the drawing, as follows.

BRIEF DESCRIPTION OF THE DRAWING

The drawing is a representative schematic diagram of the electrical components of the present invention interconnected to a microprocessor in an electronic postage meter.

DETAILED DESCRIPTION

Referring to the drawing, the monitoring circuit of the present invention is illustrated generally at 10. A microprocessor (CPU) 12 is programmed via a PROM or ROM 14 to emit pulses within a preset time interval, e.g., 10 milliseconds, to indicate that the microprocessor 12 is properly performing through programmed instructions and has not gone awry. The pulses are transmitted from the CPU 12 through I/O port 16 to the base of a P-N-P transistor 18 via lead 20. A +5 V bias is also coupled to the base of transistor 18 through a blocking diode 22 and blocking capacitor 24. The pulses from the I/O port 16 are applied to the base of the transistor 18 through blocking capacitor 24. The base is also coupled to resistor 23 and capacitor 25, which is coupled to ground, to provide a d.c. bias.

The collector of the transistor 18 is coupled to common or ground. The emitter of the transistor 18 is coupled through resistor 28 to the external timing capacitor 30 of a timer chip 26, such as chip LM 555, available from National Semiconductor Corporation. Such a timer chip 26 includes a comparator which is reset upon receipt of an input pulse. The receipt of an input pulse discharges the timing capacitor 30 and restarts the timing action. If a pulse is not received prior to the point where the charging voltage exceeds two-thirds of the +5 V supply voltage, the timer chip 26 changes state. The timing capacitor 30 in conjunction with resistor 34, determines the timing window, e.g., 10 milliseconds.

The resistor 34 and shaping diode 36 are coupled to the timer chip 26. The diode 36 disables the monitoring circuit 10 during power up to ensure that the monitoring circuit 10 is activated only after the microprocessor 12 is in a stable state. A +5 V bias is applied to the resistor 34. The shaping diode 36 is also coupled to the CPU 12.

The output of the timer chip 26 is coupled to one input of an OR gate 38. This same input is also coupled to a +5 V source through coupling resistor 40. The other input to the OR gate is supplied on lead 42 from the CPU 12.

The output of the OR gate 38 provides one input to a NAND gate 44. The other input to NAND gate 44 is provided from the +5 V source applied thereto through a coupling resistor 46. The output of the NAND gate 44 is coupled to the +5 V source through a coupling resistor 48 and to the CPU 12 via lead 50.

In operation, the microprocessor 12 under control of a ROM 14 normally emits a pulse within a preset time limit, e.g., 10 milliseconds. This pulse is applied to the blocking capacitor 24 through the I/O port 16 to the base of the transistor 18. The appearance of such a signal at the base of the transistor 18 causes the transistor 18 to conduct. This signal effectively depletes the charge of the timing capacitor 30 and the timing action is initiated again for the next cycle. Thus, a pulse received by the transistor 18 prior to completion of the timing window of the timer chip 26 will reset the timer chip 26 and no change will appear at the output terminal of the timer chip 26. Since no change appears at the output of the timer chip 26, a high output is applied to the OR gate 38. The other input to the OR gate 38, which is supplied by the CPU 12, is normally low. Thus, the output of the OR gate is high. The high output from the OR gate 38 is applied to one input terminal of the NAND gate 44. A high input is applied to the other input terminal to the NAND gate 44 via coupling resistor 46. Since both inputs to the NAND gate 44 are high, the output is low. Therefore, the monitoring circuit 10 normally holds the output of the NAND gate 44 low and and so informs the microprocessor 12 via lead 50. This low output advises the microprocessor 12 that it is proceeding properly in executing the programmed instructions.

In the absence of an output pulse from the microprocessor 12 within the preset time interval, the transistor 18 does not switch to its conducting state. Thus, the timer chip 26 is not reset and provides an output change representing a lower level. That is, the timer chip 26 is not reset and emits an output pulse representing a low signal. This low signal appears at the output of the OR gate 38 and at one of the input terminals of the NAND gate 44. Thus, the output of the NAND gate 44 goes high. This high output state is transmitted to the CPU 12 via lead 50, thereby informing the microprocessor 12 that it has gone awry in executing its programmed instructions.

In accordance with programmed instructions in the ROM 14 when a high state is present on lead 50, the microprocessor 12 may take control and return to a well defined point to recommence program execution. Further, the meter may be declared fatal and this state communicated to a RAM, or as a result of further actions the CPU 12 may be able to diagnose the error in executing its instructions.

Advantageously the monitoring circuit 10 may be effectively disabled for maintenance or diagnostic testing by maintaining a high state on lead 42 via test point (TP). This will ensure that the output of the NAND gate 44 remains low even though the timer chip 26 provides a low output signal to the other input of the OR gate 38.

It is known and understood for the purpose of the present applicaion that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example, private, parcel and freight services purchase and employ such meters as a means to provide unit value printing and accounting for individual parcels.

It should be apparent to those skilled in the art that various modifications may be made in the present invention without departing from the spirit and scope thereof, as described in the description and defined in the appended claims.

What is claimed is:

1. A monitoring circuit for an electronic postage meter operating under control of a programmed microprocessor, including:
   a transistor switch for receiving an output signal from the programmed microprocessor and generating an output signal in response thereto;
   timer means electrically coupled to said transistor switch for generating an output pulse in the absence of a signal from said transistor switch within a predetermined time interval;
   logic gate means electrically coupled to said timer means for holding its output in a first logical state in the absence of a signal from said timer means and capable of changing its output to a seacond logical state in the presence of an output signal from said timer means;
   said logic gate means includes an OR gate and a NAND gate, said OR gate having one input connected to said timer means and its output connected to the input of said NAND gate, the output of said NAND gate being connected to the microprocessor; and
   means coupled as another input to said OR gate for holding the output of said NAND gate in a desired logical state during testing.

2. The monitoring circuit recited in claim 1, wherein:
   said timer means includes a comparator which is capable of being reset by an input signal.

3. The monitoring circuit recited in claim 1, wherein:
   said transistor switch means includes a capacitor for maintaining a d.c. bias.

4. The monitoring circuit recited in claim 1, wherein:
   said timer means resets itself if a signal is received from said input means in approximately 10 milliseconds.

5. The monitoring circuit recited in claim 1, including:
   means coupled to said timer means to disable the monitoring circuit during power up of the microprocessor.

6. A monitoring circuit for an electronic postage meter operating under control of a programmed microprocessor, including:
   a transistor electrically coupled to the microprocessor, said transistor providing an output signal in response to an input from the microprocessor;
   a comparator electrically coupled to the output of said transistor for providing an output signal in the absence of receiving a signal from said transistor within a predetermined time interval;
   logic means coupled to the output of said comparator, said logic means including an OR gate having one input coupled to the output of said comparator and a NAND gate having one input coupled to the output of said OR gate, said NAND gate having its output held in a first logical state in the absence of a signal from said comparator, the output of said NAND gate chaning to a second logical state in the presence of an output signal from said comparator, said NAND gate having its output electrically connected to the programmed microprocessor to advise the same of a change in the logical state of its output; and
   means coupled to said logic gate means for holding the same in a desired logical state during testing.

7. The monitoring circuit recited in claim 6, wherein:
   said comparator provides an output pulse to said OR gate to change the logical state of the output of said NAND gate if a signal is not received from said transistor within an interval of approximately 10 milliseconds.

8. The monitoring circuit recited in claim 6, including: a timing capacitor coupled to said comparator.

9. The monitoring circuit recited in claim 6, including:
   a diode for disabling the monitoring circuit during power up of the microprocessor.

* * * * *